(12) United States Patent
Li et al.

(10) Patent No.: US 9,841,931 B2
(45) Date of Patent: Dec. 12, 2017

(54) SYSTEMS AND METHODS OF DISK STORAGE ALLOCATION FOR VIRTUAL MACHINES

(71) Applicant: VMware, Inc., Palo Alto, CA (US)

(72) Inventors: Xinhui Li, Beijing (CH); Luke Lu, San Jose, CA (US); Deng Liu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 242 days.

(21) Appl. No.: 14/231,168

(22) Filed: Mar. 31, 2014

(65) Prior Publication Data

US 2015/0277791 A1    Oct. 1, 2015

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 12/02 | (2006.01) |

(52) U.S. Cl.
CPC ............ *G06F 3/0689* (2013.01); *G06F 3/061* (2013.01); *G06F 3/064* (2013.01); *G06F 3/067* (2013.01); *G06F 3/0631* (2013.01); *G06F 3/0665* (2013.01); *G06F 12/0223* (2013.01); *G06F 2003/0692* (2013.01)

(58) Field of Classification Search
USPC ........................................................ 711/114
See application file for complete search history.

(56) References Cited

U.S. PATENT DOCUMENTS

| | | | | |
|---|---|---|---|---|
| 4,925,717 A | * | 5/1990 | Tsukamura | G11B 7/00745 346/135.1 |
| 5,576,909 A | * | 11/1996 | Dierkes | G11B 5/59605 360/77.04 |
| 5,717,888 A | * | 2/1998 | Candelaria | G06F 12/0866 711/113 |
| 5,724,539 A | * | 3/1998 | Riggle | G06F 3/0613 370/468 |
| 5,815,338 A | * | 9/1998 | Tsunekawa | G11B 5/5534 360/77.04 |
| 6,128,717 A | * | 10/2000 | Harrison | G06F 3/0608 710/11 |
| 6,693,766 B1 | * | 2/2004 | Wilkes | G11B 5/59611 360/78.08 |
| 6,854,022 B1 | * | 2/2005 | Thelin | G06F 3/0611 369/53.1 |

(Continued)

*Primary Examiner* — Charles Rones
*Assistant Examiner* — Sidney Li

(57) ABSTRACT

A method for allocating storage for a virtual machine includes receiving a request to allocate a block of disk storage on a physical disk to a virtual disk associated with the virtual machine. The method also includes identifying a plurality of available blocks on the physical disk, each of the plurality of available blocks defining a radial distance from a center axis of a platter of the physical disk. The method further includes determining which of the plurality of available blocks has a greatest radial distance from the center axis of the platter and, based on the determining, selecting an allocation block from the plurality of available blocks, the allocation block having the greatest radial distance from the center axis of the platter. The method also includes allocating the allocation block to the virtual machine.

21 Claims, 7 Drawing Sheets

(56) References Cited

U.S. PATENT DOCUMENTS

| | | | | |
|---|---|---|---|---|
| 6,898,171 B1* | 5/2005 | Sugaya | G11B 7/00745 | 369/275.3 |
| 7,685,360 B1* | 3/2010 | Brunnett | G06F 3/0608 | 360/31 |
| 8,019,925 B1* | 9/2011 | Vogan | G06F 12/04 | 711/202 |
| 8,699,185 B1* | 4/2014 | Teh | G11B 5/012 | 360/135 |
| 8,976,636 B1* | 3/2015 | Martin | G06F 17/30584 | 369/30.01 |
| 2002/0124137 A1* | 9/2002 | Ulrich | G06F 3/0613 | 711/113 |
| 2002/0165892 A1* | 11/2002 | Grumann | G06F 11/34 | 718/100 |
| 2004/0013062 A1* | 1/2004 | Hino | G11B 7/00745 | 369/47.14 |
| 2005/0188153 A1* | 8/2005 | Yun | G06F 3/0614 | 711/112 |
| 2006/0259687 A1* | 11/2006 | Thomas | G06F 3/0607 | 711/114 |
| 2006/0259727 A1* | 11/2006 | Thomas | G06F 3/0607 | 711/165 |
| 2008/0091877 A1* | 4/2008 | Klemm | G06F 3/061 | 711/114 |
| 2009/0070541 A1* | 3/2009 | Yochai | G06F 3/0605 | 711/165 |
| 2009/0157942 A1* | 6/2009 | Kulkarni | G06F 3/0604 | 711/6 |
| 2009/0228654 A1* | 9/2009 | Lakowicz | G06F 8/61 | 711/115 |
| 2011/0026852 A1* | 2/2011 | Austin | G11B 20/1217 | 382/305 |
| 2011/0138148 A1* | 6/2011 | Friedman | G06F 3/0613 | 711/173 |
| 2013/0031306 A1* | 1/2013 | Kim | G06F 12/0862 | 711/113 |
| 2013/0173850 A1* | 7/2013 | Song | G06F 12/0246 | 711/103 |
| 2013/0254508 A1* | 9/2013 | Patil | G06F 3/0619 | 711/170 |
| 2014/0052908 A1* | 2/2014 | Govande | G06F 3/0673 | 711/112 |
| 2015/0160882 A1* | 6/2015 | Coker | G06F 3/0626 | 711/111 |

* cited by examiner

SYSTEMS AND METHODS OF DISK STORAGE ALLOCATION FOR VIRTUAL MACHINES

BACKGROUND

This disclosure relates generally to allocating storage for virtual machines and, more specifically, to systems and methods for selecting available blocks from physical disks for allocation to virtual disks based on a location of the available blocks on the physical disks.

Some known computing systems execute the large scale processing of data-sets on clusters of commodity hardware using tools such as Apache Hadoop® (The Apache Software Foundation Corp., a Delaware corporation). These types of tools break up a large processing problem into multiple smaller units of work. The tool distributes these units of work to multiple servers in a cluster ("worker nodes"), thereby distributing a computing burden to multiple processing engines. Such computationally intensive tasks may include high processing demands and/or high input/output (I/O) processing demands.

Tools like Apache Hadoop® may be implemented on a physical server cluster directly or on a virtual server cluster. A virtual server cluster may include one or more physical servers executing a hypervisor and multiple virtual machines ("VMs"), each executing their own guest operating system and applications. A virtual server cluster may use one or more rotational disk drives to support operations, such as storing operating system and application data. Further, the virtual server cluster and its VMs may be used to process I/O intensive tasks by leveraging the VMs as worker nodes. Accordingly, the rotational disk drives may be subjected to high I/O processing demands during operation.

BRIEF DESCRIPTION OF THE DRAWINGS

FIGS. 1-8 illustrate exemplary embodiments of the methods and systems described herein.

FIG. 2 is a block diagram that illustrates a host computer 108 supporting one or more virtual machines 112 to which disk storage may be allocated according to one embodiment of the present disclosure.

FIG. 3 is a schematic diagram of an exemplary rotational disk drive that may be used with the virtualized computer system shown in FIG. 1.

FIG. 4 is a schematic diagram of a disk platter of the rotational disk drive shown in FIG. 2 having a plurality of tracks.

FIG. 5 is a schematic diagram of a disk platter of the rotational disk shown in FIG. 3 including a plurality of sectors that may be allocated to the virtual disks shown in FIG. 4.

FIG. 6 is an illustration showing a relationship between physical sectors shown in FIG. 5 and a logical block addressing of those physical sectors that are assigned to the virtual disks shown in FIG. 1.

FIG. 7 is a flow diagram of an exemplary method for allocating the sectors shown in FIG. 6 to the virtual machine shown in FIG. 1 using the logical block addressing shown in FIG. 6.

FIG. 8 shows an example configuration of a database within a computing device, along with other related computing components, that may be used to allocate disk storage to virtual machines.

DETAILED DESCRIPTION

Systems and methods described herein facilitate allocating blocks, or sectors, of rotational disk storage devices for I/O intensive workloads in a virtual server cluster environment. More specifically, the systems and methods described herein facilitate enhanced I/O throughput in a virtual server cluster by controlling block selection during a storage allocation process. For example, a virtual server operating system controls block selection while allocating blocks to a virtual disk (VDISK) (e.g., an area of storage space partitioned within the rotational disk drive) for a virtual machine (VM). As discussed in further detail below, embodiments of the present disclosure allocate outer blocks to those virtual machines and/or VDISKS that are associated with I/O intensive workloads.

The following detailed description illustrates embodiments of the disclosure by way of example and not by way of limitation. It is contemplated that the disclosure has general application to storage allocation for virtual machines.

Figure 1A:
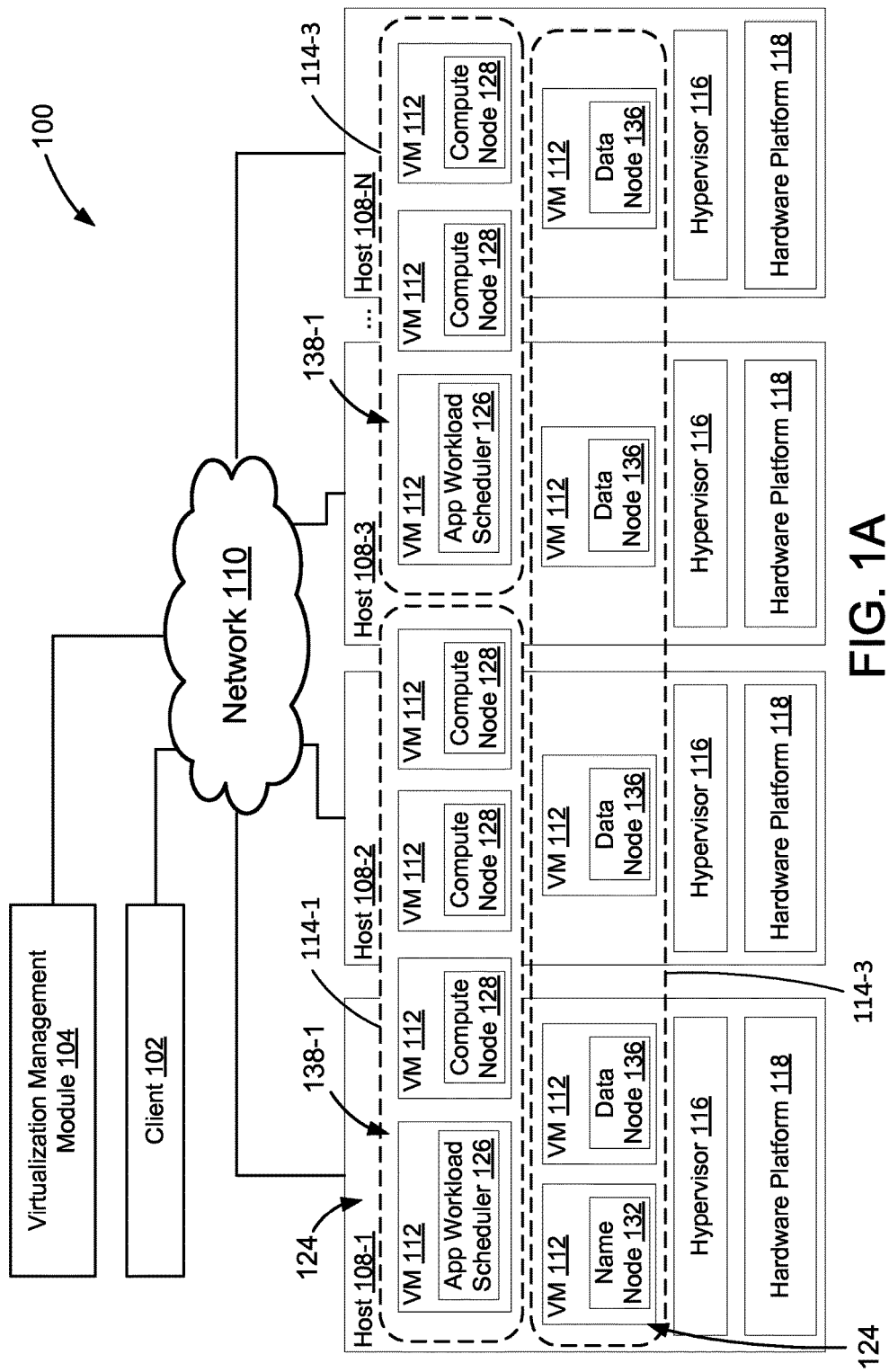
FIG. 1A is a block diagram that illustrates a computing system in which disk storage may be allocated to virtual machines as described herein.

FIG. 1A is a block diagram that illustrates a computing system 100 in which disk storage may be allocated to virtual machines as described herein. As illustrated, computing system 100 includes a plurality of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere product made commercially available from VMware, Inc.

In one embodiment, VMs 112 may be organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

As shown, VMs 112 of hosts 108 may be provisioned and used to execute a number of workloads that deliver information technology services, including web services, database services, data processing services, and directory services. In one embodiment, one or more VMs 112 are configured to serve as a node of a cluster 120 generated and managed by a distributed computing application 124 configured to elastically distribute its workload over a plurality of VMs that acts as nodes of the distributed computing application. Distributed computing application 124 may be configured to incorporate additional VMs or to release unused VMs from its cluster—thereby growing and shrinking its profile within computing system 100. VMs 112 executing as nodes of distributed computing application 124 are shown in greater detail in FIG. 2.

Figure 2:
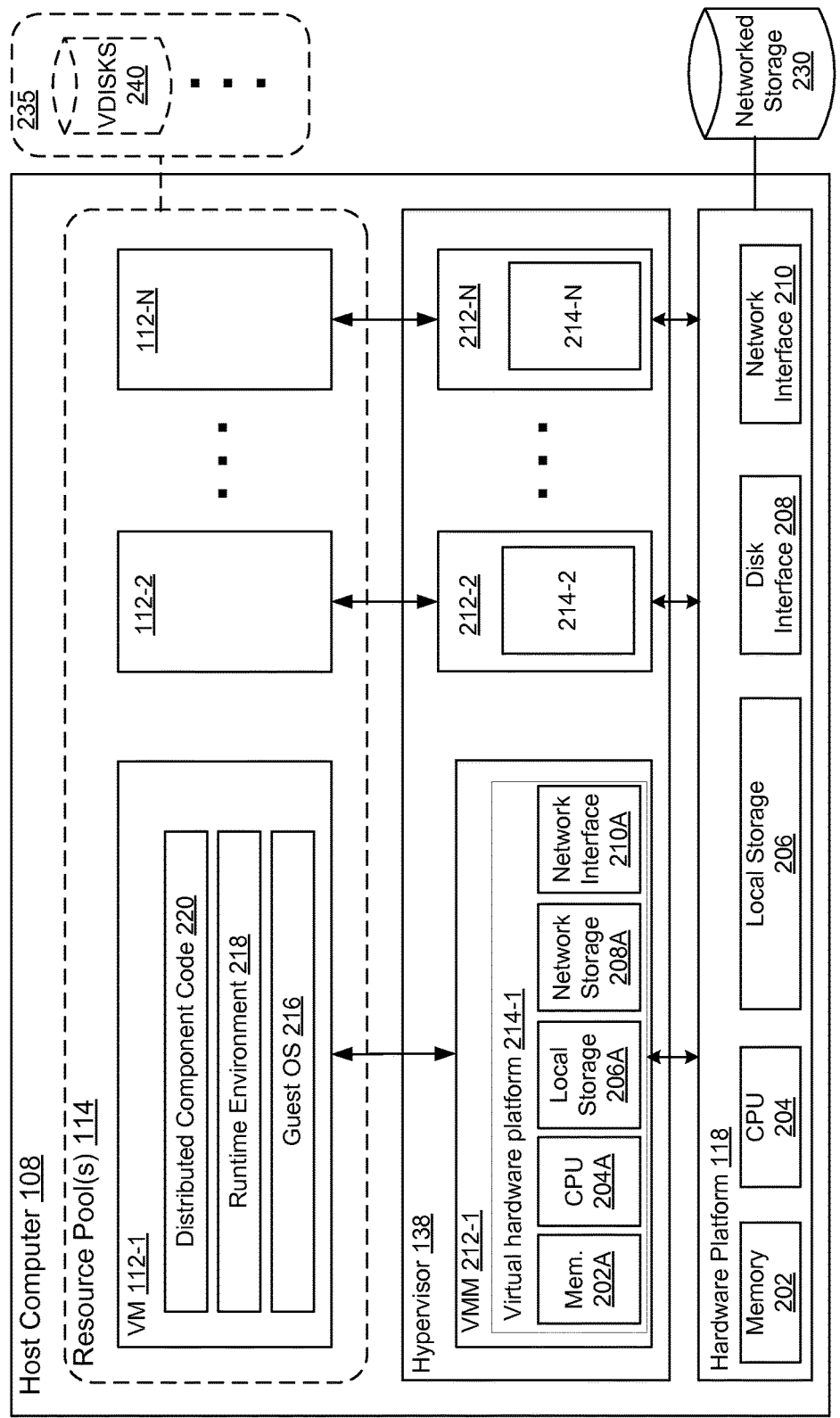

FIG. 2 is a block diagram that illustrates a host computer 108 supporting one or more virtual machines 112 to which disk storage may be allocated according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more rotational hard disk drives as described below in reference to FIGS. 3-6, and solid state disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Networked storage 230 may also include one or more rotational hard disk drives. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 (e.g., "hosted virtualization") or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. In some embodiments, virtual hardware platform 214, or hypervisor 138 generally, may provide storage that is configured as a part of one or more datastores 235 and presented to VMs 112 as a virtual disk, or VDISK 240. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application executing MapReduce version 1, a VM 112 may have a runtime environment 218 (e.g., JVM) that executes distributed software component code 220 implementing a workload scheduler function (sometimes referred to as "Job Tracker"), "Task Tracker" function, or "Name Node" function, "Data Node" function, described further below. In another example embodiment, distributed computing application 124 is a Hadoop application implementing YARN in which a VM 112 may have a runtime environment 218 (e.g., JVM) that executes distributed software component code 220 implementing a "Resource Manager" function, "Application Master" function, "Node Manager" function, "Data Node" function, and "Container" function, also described further below. Alternatively, each VM 112 may include distributed software component code 220 for distributed computing application 124 configured to run natively on top of guest OS 216.

Referring back to FIG. 1A, computing system 100 includes a virtualization management module 104 that may communicate to the plurality of hosts 108 via network 110. In one embodiment, virtualization management module 104 is a computer program that resides and executes in a central server, which may reside in computing system 100, or alternatively, running as a VM in one of hosts 108. One example of a virtualization management module is the vCenter® Server product made available from VMware, Inc. Virtualization management module 104 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 104 may issue commands to power on, power off, reset, clone, deploy, and provision one or more VMs 112 executing on a particular host 108. In one embodiment, virtualization management module 104 is configured to communicate with hosts 108 to collect performance data and generate performance metrics (e.g., counters, statistics) related to availability, status, and performance of hosts 108, VMs 112, and resource pools 114.

Virtualization management module 104 may be configured to provide a virtual environment scheduler functionality that balances load across system 100 by balancing the VMs across hosts 108. For example, if the resource usage on one of the VMs in a resource pool drastically changes, the virtualization management module 104 moves around, or migrates, VMs among the physical hosts to optimize distribution of virtual machines across the hosts. Further, if the overall workload of all VMs decreases, the virtualization management module 104 may power down some of the physical hosts and consolidate the VMs across the remaining physical hosts. One example of a virtual environment scheduler is the VMware Distributed Resource Scheduler (DRS®) product made available from VMware, Inc.

In one embodiment, distributed computing application 124 may be an implementation of the MapReduce model, which is a distributed processing framework for large-scale data processing. MapReduce computations, referred to as jobs or applications, are broken into tasks that run in two phases—Map and Reduce. During the Map Phase, (Map) tasks read data from a distributed file system (in parallel) and perform their computations in parallel. At the end of the Map phase, the intermediate output (results of the computations) generated locally are sent to a plurality of reduce tasks (potentially remote) for aggregation or further processing during the Reduce phase, before the final results are written to the distributed file system. Hadoop is an open-source implementation of the MapReduce model, and may rely on a Hadoop Distributed File System (HDFS) for data storage.

In one embodiment, distributed computing application 124 includes an application workload scheduler 126 (e.g., executing in a VM) which accepts jobs from clients 102 and schedules corresponding workloads for execution on a plurality of compute nodes 128 that are associated with distributed computing application 124. In some implementations of Hadoop, application workload scheduler 126 may be referred to as a "JobTracker" node. Each compute node 128, which may be executing as a VM 112, is a worker node that carries out tasks (e.g., map tasks, reduce tasks of a MapReduce job) provided by application workload scheduler 126. Each compute node 128 may handle multiple tasks in parallel. In one embodiment, a compute node 128 is configured to run one or more tasks in one or more available "slots". In one example, each slot may be implemented as an instance of a runtime environment (e.g., Java Virtual Machine) executing distributed software component code (e.g., code 220) for completing a single task. As such, in some embodiments, each compute node 128 may execute multiple instances of the runtime environment to execute in parallel multiple tasks assigned to the compute node by the workload scheduler 126. In some implementations of Hadoop, compute nodes 128 may be referred to as "TaskTracker" nodes. If a compute node 128 fails due to hardware failure, software error, network problems, or other issues, application workload scheduler 126 is able to adjust its scheduling of the application workload accordingly. For example, application workload scheduler 126 may mark failed compute VMs as "unavailable" for accepting tasks, and modify placement of unfinished and subsequent tasks to other slots in same nodes or other nodes based on the reduced amount of available resources.

Distributed computing application 124 may use a distributed file system 130, such as HDFS, configured to store and access data files in a distributed manner across nodes, referred to herein as Data Nodes 136. A file stored in distributed filesystem 130 is split into one or more data blocks, and the data blocks are stored in a set of Data Nodes 136. Each Data Node 136 may use and manage a data store in local storage 206 of the host on which each Data Node 136 is executing or in networked storage 230 accessible to the host on which each Data Node 136 is executing to store data blocks used by distributed computing application 124. In one embodiment, distributed filesystem 130 includes a Name Node 132 configured to track where data is located within storage resources of hosts 108 (e.g., local storage 206 and networked storage 230) and determine mappings of data blocks to Data Nodes 136. Data Nodes 136 may be configured to serve read and write requests from clients of distributed filesystem 130, including distributed computing applications 124. Data Nodes 136 may be further configured to perform block creation, deletion, and replication, upon instruction from name node 308. In the example embodiments, storage allocation is performed by a lower-level system such as, for example, a guest OS or a hypervisor.

In some embodiments, a virtual disk accessed by a VM 112 is represented by emulated local storage 206A and implemented as a file stored in local storage 206 of hardware platform 118. One example of a format for a virtual disk file is the ".vmdk" file format developed by VMware, Inc., although it should be recognized that any virtual disk file format may be utilized consistent with the teachings herein. Such a virtual disk may be used by guest OS 216, runtime environment 218, and distributed software component code 220. In such an embodiment, Data Nodes 136 may store and access HDFS data blocks within the virtual disk (i.e., emulated local storage 206A), where HDFS operates on top of the file system of guest OS 216, and, for example, stores HDFS data blocks as files within a directory of the file system of guest OS 216.

In some cases, multiple users may wish to run jobs concurrently in a distributed computing application, such as Hadoop. Such use-cases are often referred to as "multi-tenant" scenarios, where different client-organizations ("tenants") wish to share a single instance of the distributed computing application. Conventional Hadoop deployments have supported such multiple jobs using "Capacity" and "Fairness" metrics used in Hadoop scheduling, however there are several limitations under the conventional form. For example, in some cases, "slots" of worker nodes are conventionally only estimates of resources that will be consumed by each task. There is generally no enforcement (e.g., by killing a task) to ensure that these tasks conform to these limits. As such, conventional Hadoop deployments have been unable to provide quality of service (QoS) guarantees across tenants due to lack of enforcement of resource constraints and tradeoffs between over-commitment of resources and low resource utilization.

According to one embodiment, distributed computing application 124 may include separate virtual clusters 138 (e.g., 138-1, 138-2) per tenant. As shown in FIG. 1, separate clusters 138-1, 138-2, which include separate sets of application workload scheduler 126 and compute nodes 128, may be executing within computing system 100. Such embodiments advantageously provide stronger VM-grade security and resource isolation, and also enable deployment of multiple Hadoop runtime versions, or deployment of various types of frameworks besides and including Hadoop. For example, one cluster of a deployed framework that is a test version can be deployed in the same computing system as another cluster of a deployed framework that is a production version of Hadoop.

In one or more embodiments, each host 108 may include a separate Data Node 136 executing as a VM and one or more compute nodes 128 executing as VMs. In contrast to traditional implementations of Hadoop where each node is a combined data and compute node, this separation of compute and Data Nodes into separate VMs enables embodiments described herein to elastically scale Hadoop clusters as compute VMs 128 may be powered on and off without affecting HDFS. Accordingly, embodiments described herein advantageously provide efficient multi-tenancy and improved resource utilization. Further, while physical deployments of Hadoop can be modified to separate data and compute nodes, it has been determined that this may result in some machines being fully dedicated for compute and others fully dedicated for storage, which in turn leads to under-utilization of resources. Although some operating system-level virtualization techniques, such as Linux containers, can address some of these issues, it has been determined that operating system-level virtualization cannot guarantee the performance and security isolation that VMs provide to effectively support multi-tenancy. Accordingly, in embodiments of distributed computing application 124 running on a virtualized environment such as computing system 100, compute VMs 128 and data VMs 136 can be deployed on a same host 108, providing the ability to share the underlying hardware resources while allowing true multi-tenancy and elasticity.

In one or more embodiments, distributed computing application 124 includes separate compute clusters 138 for different tenants sharing a same storage layer of distributed filesystem 130 (e.g., HDFS). An example of a shared storage layer for multiple compute clusters 138 is described later in conjunction with FIG. 3. In other embodiments, distributed computing application 124 includes separate compute clusters 138 per tenant, each compute cluster communicating with a different instance of a storage layer. An example of multiple storage clusters for multiple compute clusters is described later in conjunction with FIG. 4.

Figure 1B:
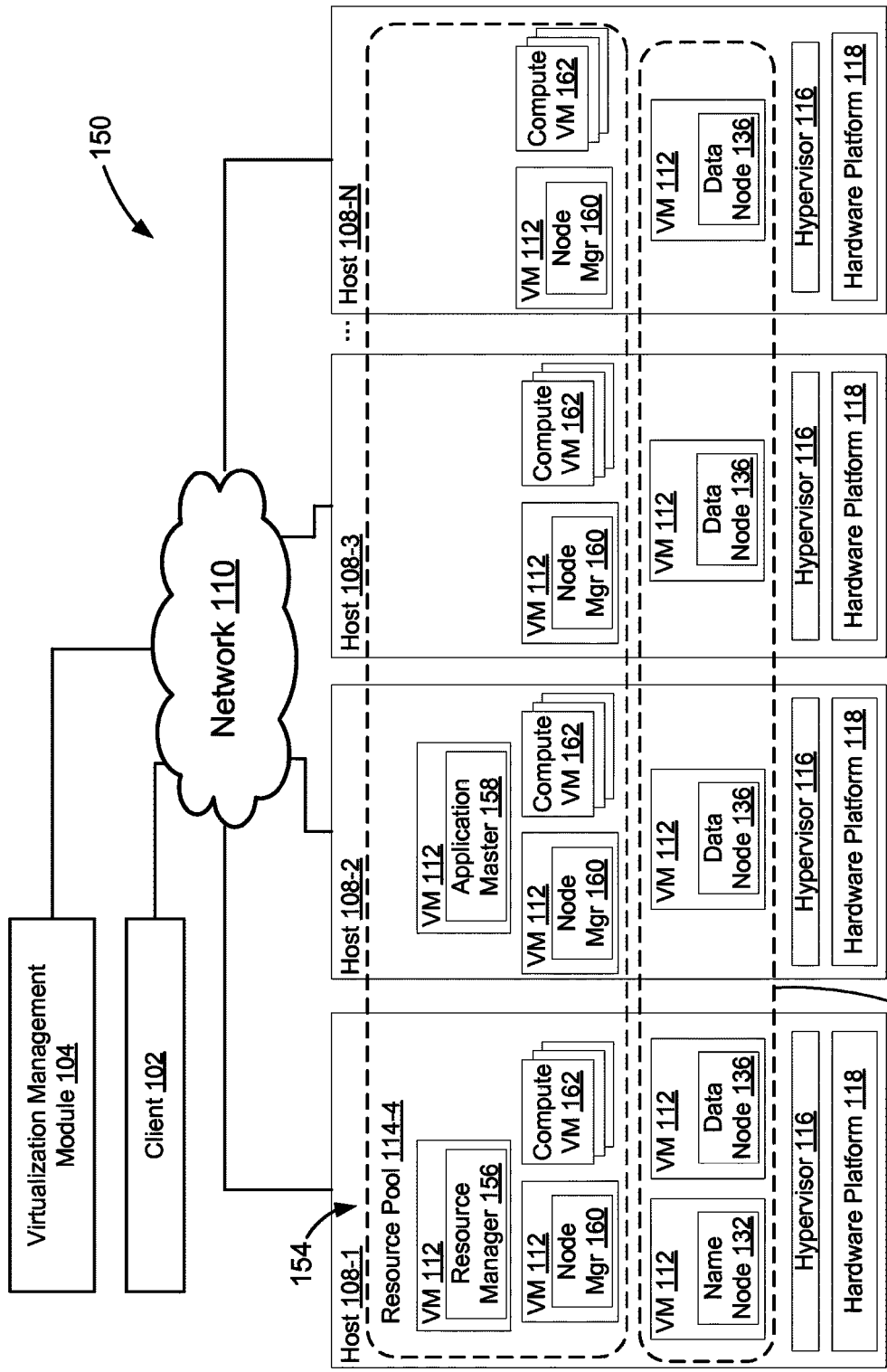
FIG. 1B is a block diagram that illustrates an alternative embodiment of a virtualized computing system within which disk storage may be allocated to virtual machines as described herein.

While the embodiment shown in FIG. 1A depicts one example architecture of a Hadoop application configured to process a large set of data using a distributed set of nodes, it should be recognized that alternative architectures, such as YARN (Yet Another Resource Negotiator) and other MapReduce-related architectures, may be utilized with the techniques described herein, as shown in FIG. 1B. It should be further recognized that, while embodiments of present disclosure are described in terms of a Hadoop installation, other distributed computing applications may be configured and utilized according to the techniques provided herein.

FIG. 1B is a block diagram that illustrates an alternative embodiment of a virtualized computing system 150 with which one or more embodiments of the present disclosure may be utilized. Computing system 150 includes an instance of a distributed computing application 154, which may be a Hadoop application configured according to a next generation framework, referred to as Hadoop YARN, which supports arbitrary distributed processing frameworks. YARN provides a collection of daemons and components that are responsible for handling resource requests from processing frameworks, resource acquisition, and scheduling. The distributed processing frameworks are then free to use the resources granted as each processing framework sees fit.

Distributed computing application 154 includes a resource manager 156, a plurality of node managers 160, and at least one application master 158. Resource manager 156, also referred to as a Hadoop Resource Manager (HRM), may be configured to accept jobs from clients (e.g., client 102) and manage resources for executing workloads within one or more nodes of distributed computing application 154. Application master 158 may be a framework-specific library configured to negotiate resources from resource manager 156 and work with one or more node managers 160 to schedule and execute tasks using the negotiated resources. Each job (sometimes referred to as an "application") can have its own instance of an application master 158, where a global resource manager 156 arbitrates between the application masters. Individual application masters 158 allow for better isolation, and distributed computing application 154 provides a general resource allocation framework that allows multiple frameworks to share underlying cluster resources.

In one embodiment, distributed computing application 154 uses a resource container module where frameworks make resource requests and, once granted in the form of "containers," can be used for any task desired. This leads to a more flexible resource usage model, and work-conserving resource usage that avoids a mismatch between available cluster resources and the resources required by a workload. Resource containers also provide isolation across multiple tenants as a result of policies used by a scheduler of resource manager 156 to allocate resources to different frameworks, applications, and tenants. As used herein, a container refers to a resource allocation that is the result of resource manager 156 granting a specific resource request from an application master 158. In other words, a container grants a right of application master 158 to use a specific amount of computing resources (e.g., CPU, memory, etc.) on a particular host 108 to execute tasks of a job. Application master 158 presents a container to a node manager 160 managing the host for which the container was allocated to use resources of the host for launching and executing tasks.

In one embodiment, each node manager 160 (e.g., executing on a VM 112 on a host 108) is configured to manage one or more compute VMs 162 executing on that host, monitor resource usage (e.g., CPU, memory, disk, network) of each compute VM 162, and report resource usage and performance metrics to resource manager 156. In the embodiment shown, computing system 150 includes one node manager 160 executing on each host 108, i.e., a single node manager 160 per host, although other arrangements may be used. At launch of distributed computing application 154, node manager 160 may provision (e.g., via virtualization management module 104) a set of pre-registered compute VMs 162 on each host 108. As mentioned above, each compute VM 162 is a worker node that carries out requested tasks (e.g., map tasks, reduce tasks) provided by a node manager 160, e.g., a node manager 160 executing on the same host 108. In one implementation, a compute VM 162 may execute a task by launching an instance of a runtime environment (e.g., Java Virtual Machine) executing distributed software component code 220 that executes the task.

Figure 3:
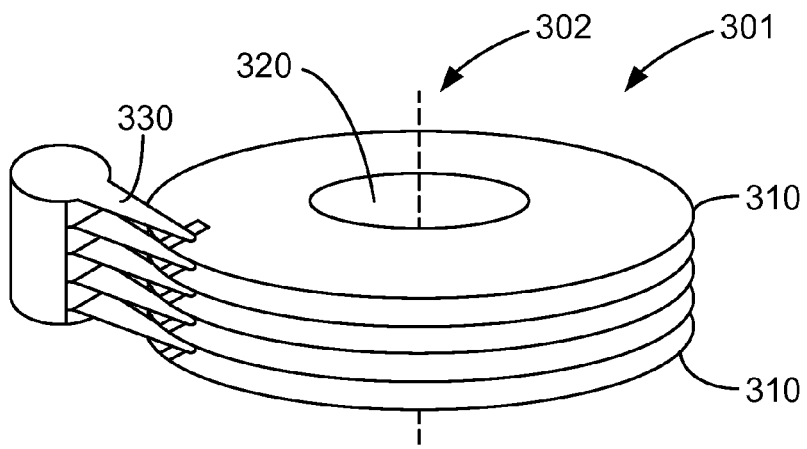

FIG. 3 is a schematic diagram of an exemplary rotational disk drive 301 that is used with the virtualized computer system 100 and/or 150 shown in FIGS. 1A and 1B. In the exemplary embodiment, disk drive 301 includes a plurality of platters 310 that are configured to rotate about a spindle 320 having a center axis 302. Disk drive 301 is a typical rotational disk drive as is known in the art, in which a plurality of platters are fixedly coupled to spindle 320 and rotate together during operation. In the example embodiment, each platter includes a storage surface comprising, for example, magnetic material capable of storing bits of data. Disk drive 301 also includes a plurality of arms 330 configured to rotate or otherwise move such that a head (not separately shown) at or near the end of the arm 330 may be positioned at various distances relative to axis 302.

Figure 4:
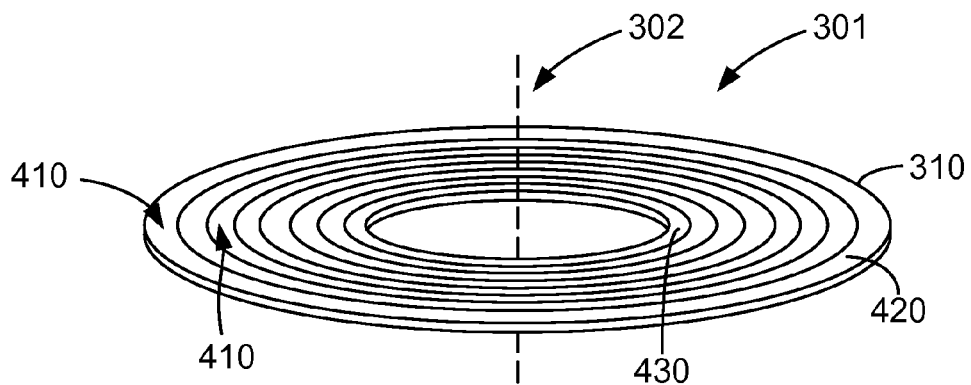

FIG. 4 is a schematic diagram of disk platter 310 of rotational disk drive 301 having a plurality of tracks 410. As is known in the art, tracks 410 are approximately concentric, non-overlapping circles, each having a radial distance from axis 302. Each track 410 includes a series of bits of data that may be read when the head of arm 330 (shown in FIG. 3) passes around track during rotation of platter 310. In the example embodiment, platter 310 includes an outer-most track 420 and an inner-most track 430. As used herein, the terms "inner" generally refer to a radial distance to the center axis, where the term "inner" means nearer axis 302 in comparison, and where the term "outer" means farther away from axis 302 in comparison. In some uses, "inner" and "outer" may be as compared to an average, and/or may be based on consideration of unallocated blocks. For example, inner track 430 is considered more "inner" than outer track 420. For another example, the track adjacent to outer track 420 may, in some situations, be considered an "outer" track (e.g., if outer track 420 is fully allocated, the adjacent track may be the most outer track having unallocated blocks).

Figure 5:
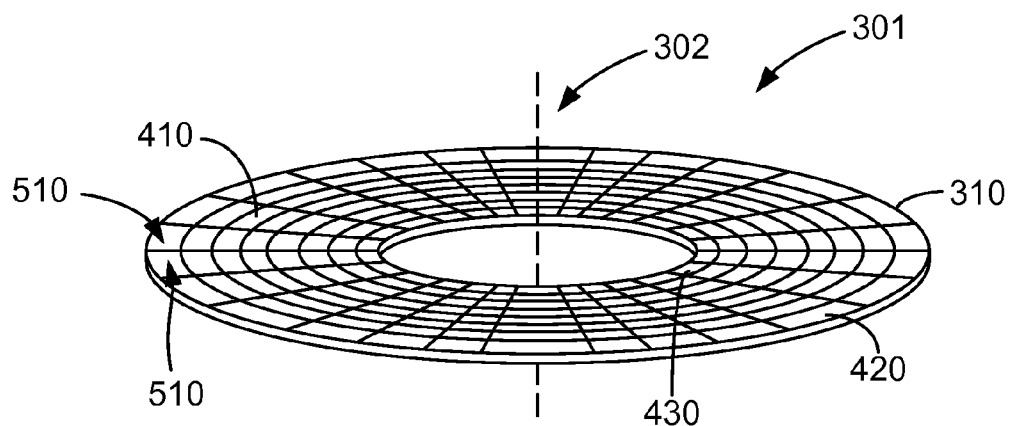
Figure 6:
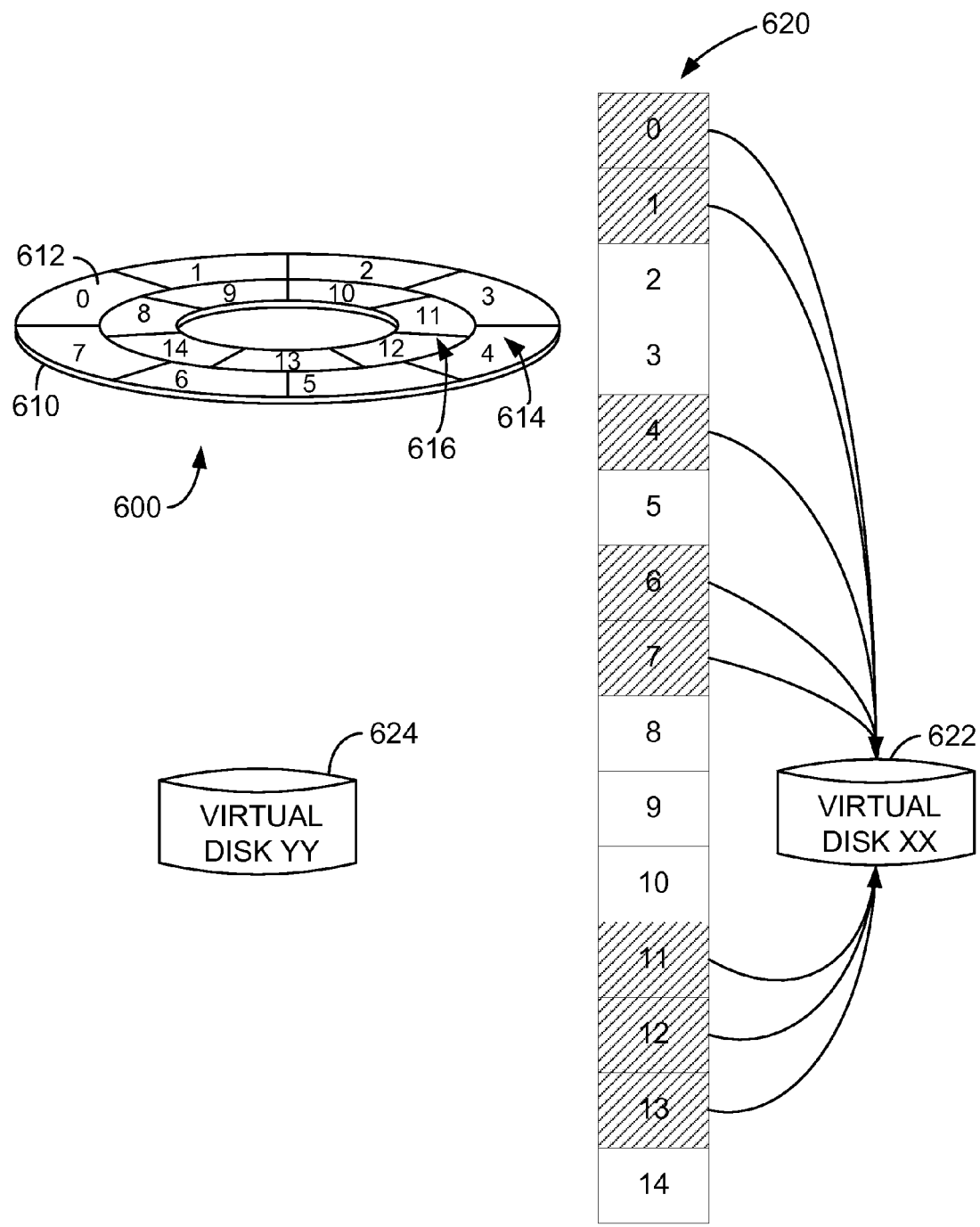

FIG. 5 is a schematic diagram of platter 310 of disk 301 in which each track 410 includes a plurality of sectors 510 that may be allocated to VDISKS 240 (shown in FIG. 2). As is known in the art, each track 410 is divided into a plurality of fixed-length sectors or blocks 510. The terms "sector" and "block" are used interchangeably herein. In the embodiment illustrated in FIG. 5, for ease of illustration, the logical configuration of platter 310 is a fixed density, such that there is the same number of sectors in each track. In other example embodiments described herein, however, platters have a variable density configuration such that the number of sectors in each track depends on the radial distance of the track from axis 302. Tracks farther away from axis 302 (i.e., more-outer tracks) have more blocks 510 per track than tracks closer to axis 302 (i.e., more-inner tracks) because, in the example disks described herein, the circumference of a track gets longer as the radial distance increases. A variable density disk is illustrated in FIG. 6, described below. During operation, each sector 510 may be allocated to a VDISK 240.

Referring now to FIGS. 3-5, a typical rotational disk drive 301 includes a plurality of platters 310. Each platter 310 is physically organized into a plurality of concentric circles, or tracks 410, at varying distances from the center spindle 302. Each track 410 is divided into a plurality of sectors, or blocks 510, where each block 510 typically includes a fixed number of bytes, such as 512 bytes per block or 4,096 bytes per block 510. Each block 510 of storage may be individually identified and assigned by an operating system.

The rotational disk device 301 also includes one or more heads for reading data (e.g., from blocks 510) from each platter 310. A typical head is mounted to an actuator arm 330 and moved between tracks 410. The spindle 302 rotates the platters 310 beneath the head at a particular rotational speed such as, for example, 15,000 rotations per minute (RPM). In some rotational disk devices, the sector density of each track (e.g., the number of blocks 510 that fits within a track 410) differs based on the distance from the center spindle 302 (referred to herein as "variable density"). For example, the inner-most track 430 (i.e., the track with the shortest radius, or the track closest to the spindle 302) may have fewer blocks 510 than the outer-most track 420 (i.e., the track with the largest radius, or the track farthest from the spindle 302). As such, presuming disk 301 is rotating at a constant speed, a head hovering over the outer-most track 420 may be able to to read at a higher number of blocks 510 per rotation (e.g., at a higher rate) than a head hovering over the inner-most track 430. As such, I/O operations from the more outer tracks may be able to yield better throughput than I/O operations from the more inner tracks.

FIG. 6 is a diagram illustrating a relationship between physical sectors 612 of a disk 600, a logical block address list 620 associated with physical sectors 612, and an example allocation of some sectors 612 to an existing VDISK 622. In some embodiments, disk 600 is similar to disk device 301 (shown in FIGS. 3-5), and VDISKS 622 and 624 are similar to VDISKS 240 (shown in FIG. 2). In the example embodiment, disk 600 includes one platter 610 that has 15 sectors 612 which are a part of datastore 235 (shown in FIG. 2) upon which a VMFS file system is created. A relatively small number of blocks are used here for ease of illustrating allocation operations performed by system 100 (shown in FIG. 1). Outer track 614 is the outer-most track on platter 610, and inner track 616 is the next inner track adjacent to outer track 614. While platter 610 is shown with only two tracks for illustration purposes, it should be understood that any number of tracks may be present that enables operation of the systems and methods as described herein.

In the example embodiment, disk 600 is a variable density disk, and each sector or block 612 is numbered 0 to 14, with blocks 0 to 7 being in outer track 614 and blocks 8-14 being in inner track 616. The block numbering of platter 610, in the example embodiment, identifies a logical block address of each block. In some known disk device addressing schemes, each sector has an associated physical block address that is used by the disk device itself. Further, sectors may also have a logical block address which, during initial operations, may be the same as the sector's physical address. However, over time, as blocks are identified as defective (i.e., bad blocks), data from a bad block may be relocated to another free block. To maintain consistency, the logical block numbering of that moved sector will remain the same, and the disk device will map the logical block number to a different physical block. As such, bad blocks may be seamlessly relocated. Accordingly, in normal situations, system 100 uses logical block addresses to determine an approximate physical position of blocks 612 relative to other blocks, but system 100 may not know that a block may have been relocated.

Logical block address list 620, in the example embodiment, represents an ordered list of blocks 612. FIG. 6 illustrates allocated blocks (i.e., used blocks) with cross-hatch background and unallocated blocks (i.e., free blocks) with a white background. In the example embodiment, blocks 0, 1, 4, 6, 7, 11, 12, and 13 are allocated to a VDISK "XX" 622. Accordingly, blocks 2, 3, 5, 8, 9, 10, and 14 are unallocated.

During operation, a VDISK such as VDISK "YY" 624 is configured with a high-performance setting, for example indicating that the VDISK 624 is associated with a I/O intensive workload (i.e., VDISK should favor outer blocks for better performance). During an allocation operation (e.g., when building a new VDISK, or when expanding an existing VDISK), the system 100 identifies the configuration setting for the VDISK 624 as favoring outer blocks, as well as the rotational disk device from which outer blocks will be allocated, such as disk 600. The system identifies the pool of available blocks (i.e., free blocks, or blocks not yet allocated) for the disk drive 600 and selects the outer-most blocks for use during the allocation operation. In some embodiments, the blocks are numbered with a logical block number in ascending order from approximately the outer-most blocks to approximately the inner-most blocks. As such, the system may use the lowest available logical block numbers as an indication of the outer-most blocks. Accordingly, once the outer-most available blocks are identified, the system performs the allocation operation with those identified blocks.

More specifically, for example, system 100 receives a request to allocate an amount of storage to a particular VDISK, such as VDISK "YY" 624. In some embodiments, the request may specify a single disk, such as disk 600, or a pool of disks to use for the allocation request. In some embodiments, the request may be, for example, a request to create a new VDISK of a certain initial size. In other embodiments, the request may be, for example, a request to expand (i.e., increase the size of) an existing VDISK by a certain amount. The expansion request may be, for example, an expansion of a traditional "thick" VDISK (e.g., a VDISK of a defined size that is only increased by operator intervention), or may be associated with an expansion of a "thin" VDISK (e.g., a VDISK that may expand automatically upon an event such as a full or near-full condition). In still other embodiments, the request may be a part of a reorganization operation associated with an existing VDISK, as described in greater detail below). For purposes of illustration, each of these requests is treated as a series of one or more sequential requests for single unallocated blocks until the requested size is achieved. Accordingly, a request for a few blocks serves, here, to illustrate the operations of system 100.

In the example embodiment, system 100 identifies an allocation setting that specifies that outer-disk allocation is to be used (e.g., a preference for allocation of blocks on radially-outer tracks). In some embodiments, this allocation setting is a configuration setting associated with a file system formatted on disk 600, such as a VMFS file system. In other embodiments, this allocation setting is a configuration setting associated with a VDISK, such as VDISK "YY" 624, or provided as an argument to an allocation request. In still other embodiments, this allocation setting is a configuration setting associated with a virtual machine, such as VM 112 (shown in FIGS. 1A, 1B, and 2), or a disk, such as disk 600.

In the example embodiment, system 100 identifies the available (i.e., unallocated) blocks on disk 600. In some embodiments, system 100 may query disk 600 to identify the available blocks. In other embodiments, system 100 maintains an internal record of which blocks have been assigned and which blocks are available. Further, in some embodiments, system 100 may perform a synchronization operation to update or refresh internal records with the data on disk devices.

Each block of disk 600 may be described and/or ordered relative to all other blocks according to its distance from the spindle 320 or central axis 302 (shown in FIG. 3). For example, a block such as block 2 may be characterized as an outer block relative to other blocks, such as block 9, because block 2 sits on a track (e.g., outer track 614) that is radially farther away from central axis 302 than the track on which block 9 resides (e.g., inner track 616). In the example embodiment, system 100 uses the logical block number of the available blocks to determine which block is the outer-most block. In other words, from the pool of available blocks 2, 3, 5, 8, 9, 10, and 14, system 100 determines that block 2 is the outer-most block. As such, system 100 selects block 2 for the present allocation request. In some embodiments, additional blocks may be similarly allocated. For example, system 100 may perform an allocation of a second block for the same allocation request. With block 2 now assigned, system 100 determines that block 3 is the next outer-most available block and selects block 3 for the present allocation request. Accordingly, system 100 may select a plurality of blocks for allocation to VDISK 624, and subsequently allocates those blocks to VDISK 624 to fulfill the request.

In the example embodiment, system 100 uses the logical block number as a metric for determining the outer-most block(s). In other words, system 100 selects the lowest numbered available block from the pool of available blocks. In other embodiments, disk 600 may be numbered in an opposite fashion, where the lower the block number represents the more inner blocks. As such, system 100 may select the largest block number as the outer-most block. In still other embodiments, system 100 may use other methods to determine which blocks are the outer-most blocks. For example, each block may be identified by a track number or a cylinder number. As such, system 100 may use the track number or cylinder number to determine which blocks are the outer-most blocks. In still other embodiments, system 100 may also maintain an offset number that represents the block address of the most outer available block. Further, system 100 may update this number as blocks are allocated and de-allocated.

Some blocks may be equivalent as to position. For example, in the example embodiment, blocks 2, 3, and 5 are all on the same track, outer track 614. As such, in some embodiments, system 100 may consider and select any of these blocks as the outer-most available block. Further, in some embodiments, other considerations may be factored into block selection. For example, during a 2-block request, blocks 2 and 3 may be considered over block 5 because they are contiguous. In other embodiments, one or more outer blocks may be skipped in lieu of these other considerations. System 100, for example, may value contiguousness against block position. In, for example, a 3-block request, system 100 may value the contiguity of blocks 8, 9, and 10 of greater weight/importance than one or more of them coming from a track only slightly farther outside. As such, system 100 may skip blocks 2, 3, and 5 and instead select blocks 8, 9, and 10 for the allocation request.

In some embodiments, VDISKS may span multiple disk devices. As such, the pool of available blocks may include available blocks from multiple disks 600. In some embodiments, system 100 maintains or accesses multiple separate logical block address lists 620. In other embodiments, system 100 maintains a joined or combined single logical block address list that tracks not only the logical block address of each block, but also the disk device to which it belongs. For example, consider a modification to logical block address list 620 that also includes a disk identifier for each block as well. During an allocation operation, system 100 thus considers block position of blocks on multiple disks, and may select the outer-most block from the full pool of available blocks on multiple disks. For example, presume a first disk has a current allocation state as shown by logical block address list 620 of FIG. 6, and further presume a second disk has blocks 9 and 14 available. System 100 may recognize that first disk block 2 is on a more outer track than second disk block 9 (presuming they are similar physical disks), and thus select first disk block 2 over second disk block 9.

In some multi-disk embodiments, other factors may also be considered along with block position relative to the spindle. For example, contiguity of multiple blocks may be considered (as described above). For another example, disk performance or disk capacity/allocation information may be considered. System 100 may, for example, choose second disk block 9 over first disk block 2 if the first disk has a historical tendency for high I/O relative to the second disk. In other words, system 100 may favor a more-inner block from one disk as opposed to a more-outer block from another because even though the outer block may yield better overall throughput in ideal conditions, the other disk is more heavily tasked due to other uses that overall performance will be better on the less-busy disk even in light of using the more-inner block. Similarly, system 100 may use overall allocation information (e.g., allocation percentages) as, for example, a proxy metric for I/O, or other allocation considerations. For example, if the first disk is 95% allocated and the second disk is 20% allocated, system 100 may weigh such a large discrepancy more heavily than a single-track difference, and as such may allocate second disk block 9 over first disk block 2.

In some embodiments, system 100 may receive a request to reallocate or defragment (defrag) an existing VDISK, such as VDISK 622. In known systems, defragmenting a disk generally involves moving blocks of data around to create contiguity amongst used blocks. In the example embodiment, system 100 also considers shifting blocks to outer tracks. For example, in the scenario shown in FIG. 5, a defragmentation of VDISK 622 may involve system 100 removing allocated blocks from disk 600 and then reallocating blocks using the methods described herein. System 100 may relocate data from a more inner track to a more outer track. For example, block 11 may be moved to free block 2 because block 2 is more of an outer block than block 11. Similarly, block 12 may be moved to block 3 and block 13 may be moved to block 5. In some embodiments, in addition to outer positional considerations, system 100 may additionally rearrange blocks based on traditionally known defragmentation techniques, such as allocating related blocks near each other (i.e., within the same track, or nearby tracks). In some embodiments, a defragment procedure may be performed on a VDISK configured with a high performance setting. During the operation, inner blocks of the high performance VDISK may be moved or swapped to outer tracks, and non-high performance VDISK tracks may be relocated to make room for the high performance VDISK blocks. In some embodiments, this defragmentation routine may be configured to execute on a periodic basis, or only migrate blocks during relatively idle I/O periods.

Figure 7:
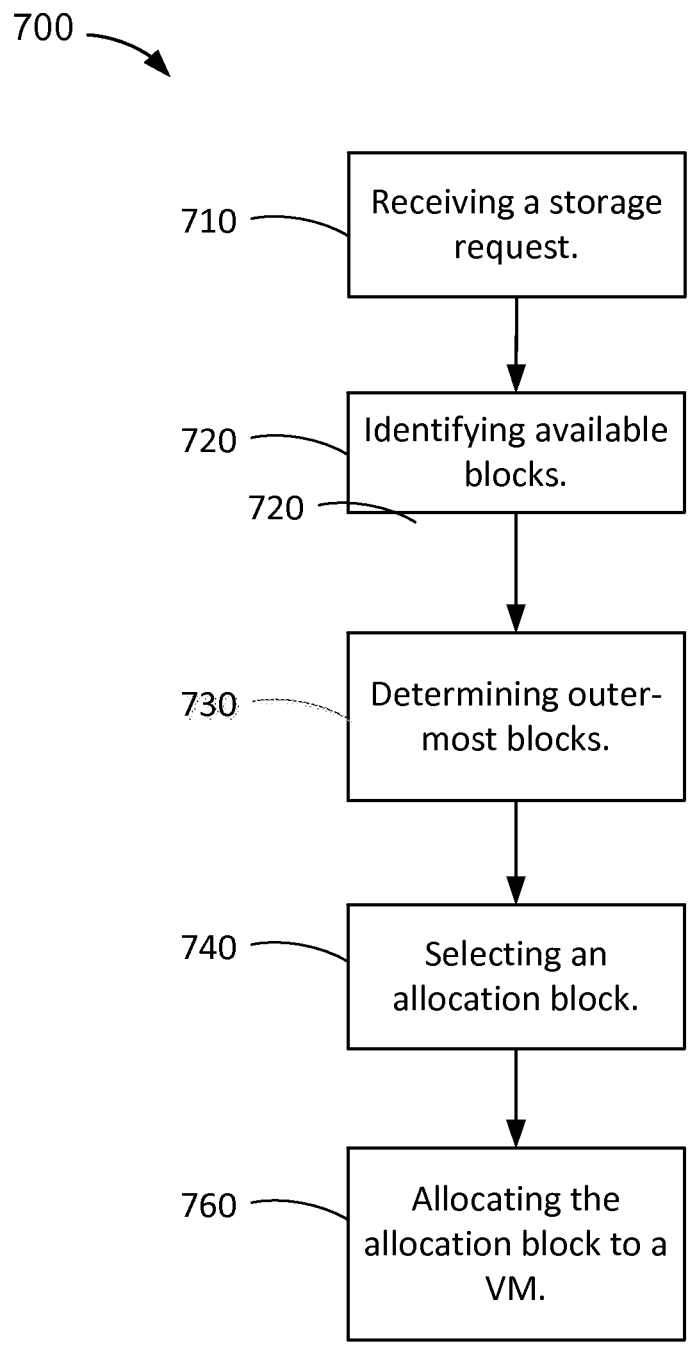

FIG. 7 is a flow diagram of an exemplary method 700 for allocating the sectors shown in FIG. 6 to VM 112 (shown in FIGS. 1A, 1B, and 2) using the logical block addressing shown in FIG. 6. In the exemplary embodiment, method 700 is performed by system 100 (shown in FIG. 1). System 100 receives 710 a request to allocate one or more blocks of disk storage on a physical disk, such as disk 600 (shown in FIG. 6), to a VDISK associated with the virtual machine, such as VDISK 624 (shown in FIG. 6). In some embodiments, system 100 identifies an allocation setting associated with one or more of the following: a VM such as VM 112, a VDISK, a physical disk such as disk 600, and a file system configured on the physical disk. The allocation setting indicates a preference for allocation of blocks on radially-outer tracks.

System 100 identifies 720 a plurality of available blocks on the physical disk. Each of the plurality of available blocks defines a radial distance from a center axis of a platter of the physical disk, such as platter 610. System 100 determines 730 which of the plurality of available blocks has a greatest radial distance from the center axis of the platter and, based on the determining, selects 740 an allocation block from the plurality of available blocks, the allocation block having the greatest radial distance from the center axis of the platter 510. System 100 allocates 750 the allocation block to the virtual machine.

In some embodiments, system 100 selects a radially outer-most available block from the plurality of available blocks. Further, in some embodiments, each block of the physical disk has an associated block address, and determining which of the plurality of available blocks has a greatest radial distance from the center axis of the platter further includes determining which of the plurality of available blocks has the lowest block address.

Moreover, in some embodiments, system 100 identifies an offset value, the offset value defining a block address of an available block from the plurality of available blocks that has the lowest block address. As such, determining which of the plurality of available blocks has a greatest radial distance from the center axis of the platter is based at least in part on the offset value. Further, system 100 may identify a next-lowest available block having the lowest block address from the plurality of available blocks not including the allocation block, and update the offset value to be the new block address of the next-lowest available block.

In other embodiments, the plurality of available blocks further include a second plurality of available blocks on a second physical disk, with each available block of the second plurality of available blocks defining a radial distance from a second center axis of a second platter of the second physical disk. In such embodiments, system 100 may also determine which of the second plurality of available blocks has a greatest radial distance from the second center axis of the second platter. System 100 may further identify a second allocation block from the second plurality of available blocks, the second allocation block having the greatest radial distance from the second center axis of the second platter. System 100 may also compare radial distances of the allocation block and the second allocation block and, based on the comparing, selecting the allocation block.

Figure 8:
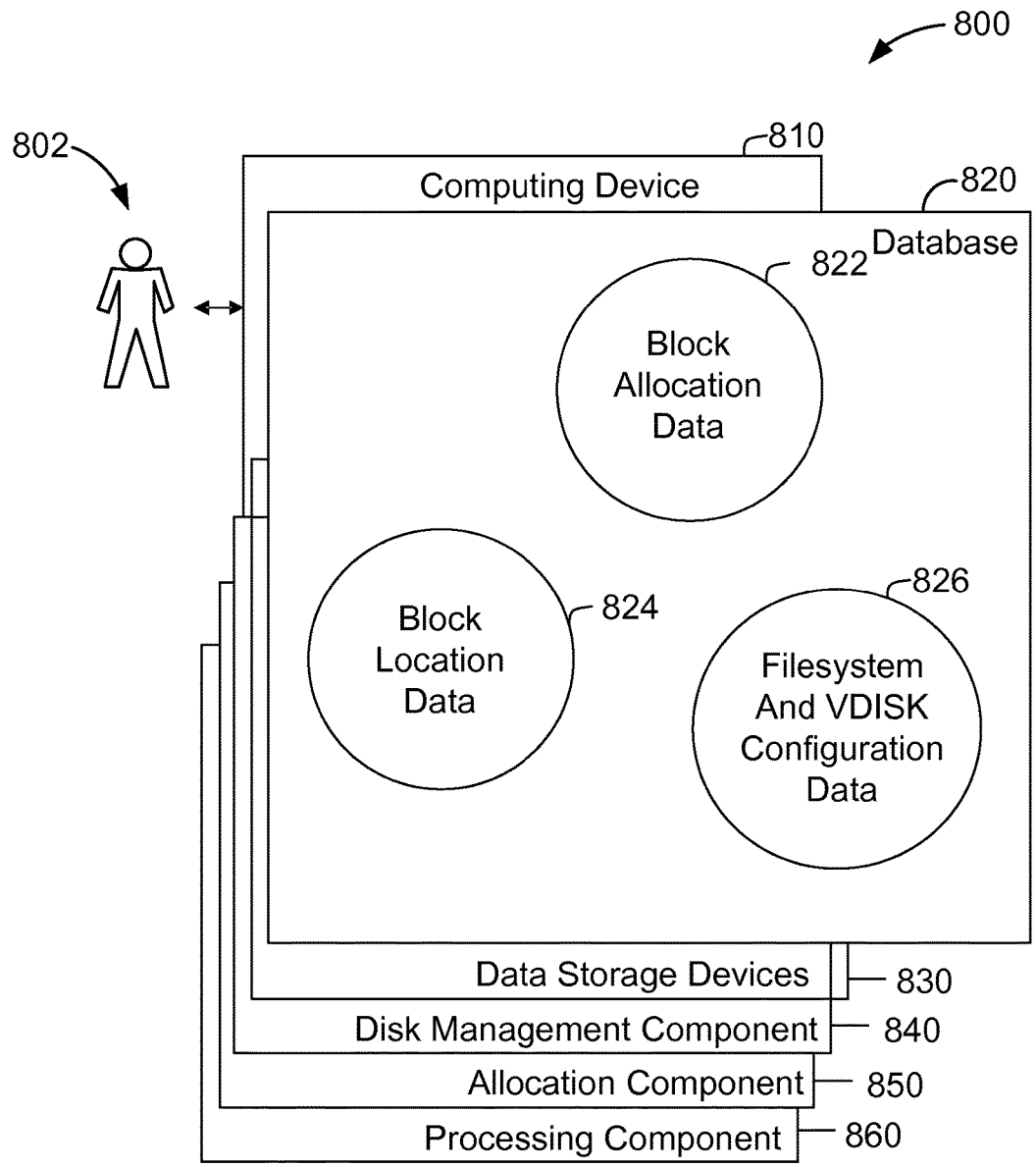

FIG. 8 shows an example configuration 800 of a database 820 within a computing device 810, along with other related computing components, that may be used to allocate disk storage to virtual machines. In some embodiments, computing device 810 is similar to system 100 (shown in FIG. 1). Database 820 is coupled to several separate components within computing device 810, which perform specific tasks.

In the example embodiment, database 820 includes block allocation data 822, block location data 824, and filesystem and VDISK configuration data 826. In some embodiments, database 820 is volume management data managed by system 100. Block allocation data 822 includes information associated with the assignment or allocation of blocks to, for example, VDISKS 622 and 624, such as described in reference to FIG. 6. Block location data 824 includes information associated with the blocks stored on physical disks, such as blocks 612 of disk 600 described in reference to FIG. 6. Filesystem and VDISK configuration data 826 includes data associated with VDISK and/or filesystem configuration settings such as discussed in reference to FIG. 6.

Computing device 810 includes the database 820, as well as data storage devices 830, such as rotational disk devices 600. Computing device 810 also includes a disk management component 840 for managing and/or analyzing block location data 824. Computing device 810 also includes an allocation component 850 for managing block allocation operations to VDISKS. A processing component 860 assists with execution of computer-executable instructions associated with the system.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

In one embodiment, a computer program is provided, and the program is embodied on a computer readable medium. In an example embodiment, the system is executed on a single computer system, without requiring a connection to a server computer. In a further embodiment, the system is being run in a vSphere® environment (vSphere is a registered trademark of VMware, Inc., of Palo Alto, Calif.) with one or more physical servers hosting a plurality of virtual machines ("VM's"). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion. The "computer-readable medium," however, do not include transitory signals.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for allocating storage for a virtual machine, the method comprising:
    receiving a request to allocate a block of disk storage on a physical disk to a virtual disk associated with the virtual machine;
    identifying a first plurality of available blocks on a first physical disk and a second plurality of available blocks on a second physical disk, each of the first and second plurality of available blocks defining a radial distance from a center axis of a platter of the respective first or second physical disk;
    in response to identifying the first plurality of available blocks on the first physical disk, determining which block of the first plurality of available blocks has a greatest radial distance from the center axis of a particular platter of a plurality of platters of the first physical disk;
    based on the determining of which of the first plurality of available blocks has the greatest radial distance from the center axis of a particular platter of the first physical disk, selecting a first allocation block from the plurality of available blocks, the first allocation block having the greatest radial distance from the center axis of the platter of the first physical disk;
    in response to identifying the second plurality of available blocks on the second physical disk, determining which block of the second plurality of available blocks has a greatest radial distance from the center axis of a particular platter of a plurality of platters of the second physical disk;

based on the determining of which of the second plurality of available blocks has the greatest radial distance from the center axis of a particular platter of the second physical disk, selecting a second allocation block from the second plurality of available blocks, the second allocation block having the greatest radial distance from the center axis of the platter of the second physical disk;

comparing radial distances of the first allocation block on the first physical disk and the second allocation block on the second physical disk;

based on the comparing, selecting a particular allocation block having the greater radial distance from one of the first allocation block and the second allocation block; and allocating the selected particular allocation block to the virtual machine.

2. The method of claim 1 further comprising identifying an allocation setting associated with one or more of the following: the virtual machine, the virtual disk, the physical disk, and a file system configured on the physical disk, wherein the allocation setting indicates a preference for allocation of blocks on radially-outer tracks, and wherein selecting the particular allocation block further comprises selecting based at least in part on the allocation setting.

3. The method of claim 1, wherein each block of the respective first and second physical disks has an associated block address, and wherein determining which of the first and second plurality of available blocks has a greatest radial distance from the center axis of the corresponding particular platter further includes determining which of the first and second plurality of available blocks has one of the highest block address and the lowest block address.

4. The method of claim 3 further comprising identifying an offset value, the offset value defining a block address of an available block from the first plurality of available blocks that has one of the highest block address and the lowest block address, wherein determining which of the first plurality of available blocks has a greatest radial distance from the center axis of the platter is based at least in part on the offset value.

5. The method of claim 4 further comprising: identifying one of a next-highest available block having the highest block address and a next-lowest available block having the lowest block address from the first plurality of available blocks not including the first allocation block; and updating the offset value to be the new block address of one of the next-highest available block and the next-lowest available block.

6. The method of claim 1, further comprising determining a current capacity of the first physical disk with the current capacity of the second physical disk, and using the current capacity of the first physical disk and the second physical disk as an additional factor in selecting the particular allocation block.

7. The method of claim 1, further comprising receiving historic performance data for the first physical disk and the second physical disk, and using the received historic performance data as an additional factor in selecting the particular allocation block.

8. A computing device for allocating storage for a virtual machine, said computer device comprising a processor communicatively coupled to a physical disk, said computing device programmed to:

receive a request to allocate a block of disk storage on a physical disk to a virtual disk associated with the virtual machine;

identify a first plurality of available blocks on a first physical disk and a second plurality of available blocks on a second physical disk, each of the first and second plurality of available blocks defining a radial distance from a center axis of a platter of the respective first or second physical disk;

in response to identifying the first plurality of available blocks on the first physical disk, determine which block of the first plurality of available blocks has a greatest radial distance from the center axis of a particular platter of a plurality of platters of the first physical disk;

based on the determining of which of the first plurality of available blocks has the greatest radial distance from the center axis of a particular platter of the first physical disk, select a first allocation block from the plurality of available blocks, the first allocation block having the greatest radial distance from the center axis of the platter of the first physical disk;

in response to identifying the second plurality of available blocks on the second physical disk, determine which block of the second plurality of available blocks has a greatest radial distance from the center axis of a particular platter of a plurality of platters of the second physical disk;

based on the determining of which of the second plurality of available blocks has the greatest radial distance from the center axis of a particular platter of the second physical disk, select a second allocation block from the second plurality of available blocks, the second allocation block having the greatest radial distance from the center axis of the platter of the second physical disk;

compare radial distances of the first allocation block on the first physical disk and the second allocation block on the second physical disk;

based on the comparing, select a particular allocation block having the greater radial distance from one of the first allocation block and the second allocation block; and allocate the selected particular allocation block to the virtual machine.

9. The computing device of claim 8, wherein the processor is further programmed to further comprising identify an allocation setting associated with one or more of the following: the virtual machine, the virtual disk, the physical disk, and a file system configured on the physical disk, wherein the allocation setting indicates a preference for allocation of blocks on radially-outer tracks, and wherein selecting the particular allocation block further comprises selecting based at least in part on the allocation setting.

10. The computing device of claim 8, wherein each block of the respective first and second physical disks has an associated block address, and wherein determining which of the first and second plurality of available blocks has a greatest radial distance from the center axis of the corresponding particular platter further includes determining which of the first and second plurality of available blocks has one of the highest block address and the lowest block address.

11. The computing device of claim 10, wherein the processor is further programmed to identify an offset value, the offset value defining a block address of an available block from the first plurality of available blocks that has one of the highest block address and the lowest block address, wherein determining which of the first plurality of available blocks has a greatest radial distance from the center axis of the platter is based at least in part on the offset value.

12. The computing device of claim 11, wherein the processor is further programmed to: identify one of a next-highest available block having the highest block address and a next-lowest available block having the lowest block address from the first plurality of available blocks not including the first allocation block; and update the offset value to be the new block address of the next-lowest available block.

13. The computing device of claim 8, wherein the computing device is further programmed to determine a current capacity of the first physical disk with the current capacity of the second physical disk, and using the current capacity of the first physical disk and the second physical disk as an additional factor in selecting the particular allocation block.

14. The computing device of claim 8, wherein the computing device is further programmed to receive historic performance data for the first physical disk and the second physical disk, and using the received historic performance data as an additional factor in selecting the particular allocation block.

15. A non-transitory computer-readable storage medium having computer-executable instructions embodied thereon, wherein, when executed by at least one processor, the computer-executable instructions cause the at least one processor to:
   receive a request to allocate a block of disk storage on a physical disk to a virtual disk associated with a virtual machine;
   identify a first plurality of available blocks on a first physical disk and a second plurality of available blocks on a second physical disk, each of the first and second plurality of available blocks defining a radial distance from a center axis of a platter of the respective first or second physical disk;
   in response to identifying the first plurality of available blocks on the first physical disk, determine which block of the first plurality of available blocks has a greatest radial distance from the center axis of a particular platter of a plurality of platters of the first physical disk;
   based on the determining of which of the first plurality of available blocks has the greatest radial distance from the center axis of a particular platter of the first physical disk, select a first allocation block from the plurality of available blocks, the first allocation block having the greatest radial distance from the center axis of the platter of the first physical disk;
   in response to identifying the second plurality of available blocks on the second physical disk, determine which block of the second plurality of available blocks has a greatest radial distance from the center axis of a particular platter of a plurality of platters of the second physical disk;
   based on the determining of which of the second plurality of available blocks has the greatest radial distance from the center axis of a particular platter of the second physical disk, select a second allocation block from the second plurality of available blocks, the second allocation block having the greatest radial distance from the center axis of the platter of the second physical disk;
   compare radial distances of the first allocation block on the first physical disk and the second allocation block on the second physical disk;
   based on the comparing, select a particular allocation block having the greater radial distance from one of the first allocation block and the second allocation block; and
   allocate the selected particular allocation block to the virtual machine.

16. The non-transitory computer-readable storage medium of claim 15, wherein the computer-executable instructions further cause the processor to identify an allocation setting associated with one or more of the following: the virtual machine, the virtual disk, the physical disk, and a file system configured on the physical disk, wherein the allocation setting indicates a preference for allocation of blocks on radially-outer tracks, and wherein selecting the particular allocation block further comprises selecting based at least in part on the allocation setting.

17. The non-transitory computer-readable storage medium of claim 15, wherein each block of the respective first and second physical disks has an associated block address, and wherein determining which of the first and second plurality of available blocks has a greatest radial distance from the center axis of the corresponding particular platter further includes determining which of the first and second plurality of available blocks has one of the highest block address and the lowest block address.

18. The non-transitory computer-readable storage medium of claim 17, wherein the computer-executable instructions further cause the processor to identify an offset value, the offset value defining a block address of an available block from the first plurality of available blocks that has one of the highest block address and the lowest block address, wherein determining which of the first plurality of available blocks has a greatest radial distance from the center axis of the platter is based at least in part on the offset value.

19. The non-transitory computer-readable storage medium of claim 18, wherein the computer-executable instructions further cause the processor to: identify one of a next-highest available block having the highest block address and a next-lowest available block having the lowest block address from the first plurality of available blocks not including the first allocation block; and update the offset value to be the new block address of the next-lowest available block.

20. The non-transitory computer-readable storage medium of claim 15, further comprising determining a current capacity of the first physical disk with the current capacity of the second physical disk, and using the current capacity of the first physical disk and the second physical disk as an additional factor in selecting the particular allocation block.

21. The non-transitory computer-readable storage medium of claim 15, further comprising receiving historic performance data for the first physical disk and the second physical disk, and using the received historic performance data as an additional factor in selecting the particular allocation block.

* * * * *